United States Patent [19]

Kishi

[11] Patent Number: 5,155,838
[45] Date of Patent: Oct. 13, 1992

[54] COMPUTER SYSTEM WITH EMULATION MECHANISM

[75] Inventor: Minoru Kishi, Oome, Japan

[73] Assignee: Kabushiki Kaisha Toshiba, Kawasaki, Japan

[21] Appl. No.: 344,603

[22] Filed: Apr. 28, 1989

[30] Foreign Application Priority Data

Apr. 28, 1988 [JP] Japan .................................. 63-106260
Apr. 30, 1988 [JP] Japan .................................. 63-108465
Sep. 30, 1988 [JP] Japan .................................. 63-245929

[51] Int. Cl.⁵ .......................... G06F 3/153; G06F 5/00
[52] U.S. Cl. ............................. 395/500; 364/DIG. 2; 364/927.81; 364/927.2; 364/939.2
[58] Field of Search ................ 364/200, 900, DIG. 1, 364/DIG. 2; 395/500

[56] References Cited

U.S. PATENT DOCUMENTS

| | | | |
|---|---|---|---|
| 4,649,479 | 3/1987 | Advani et al. | 364/200 |
| 4,835,685 | 5/1989 | Kun | 364/200 |
| 4,860,246 | 8/1989 | Inoue | 364/900 |
| 4,975,829 | 12/1990 | Clarey et al. | 364/200 |

OTHER PUBLICATIONS

Tanenbaum, A., Operating Systems, 1987, pp. 110–123.
IBM Technical Reference, 6936763.
IBM Technical Reference, Options and Adapters vol. 2, 6137806.

Primary Examiner—Gareth D. Shaw
Assistant Examiner—John C. Loomis
Attorney, Agent, or Firm—Cushman, Darby & Cushman

[57] ABSTRACT

A computer system with an emulation mechanism includes a program execution unit for executing an application program. The application program includes a write command. An emulation control unit writes an address and data concerning a write command in buffers in response to the write command. When a predetermined condition is satisfied, the emulation control unit generates and outputs an interrupt to the program execution unit. In response to the interrupt, the program execution unit executes an emulation program and emulates the address and data stored in the buffers upon execution of the emulation program.

4 Claims, 5 Drawing Sheets

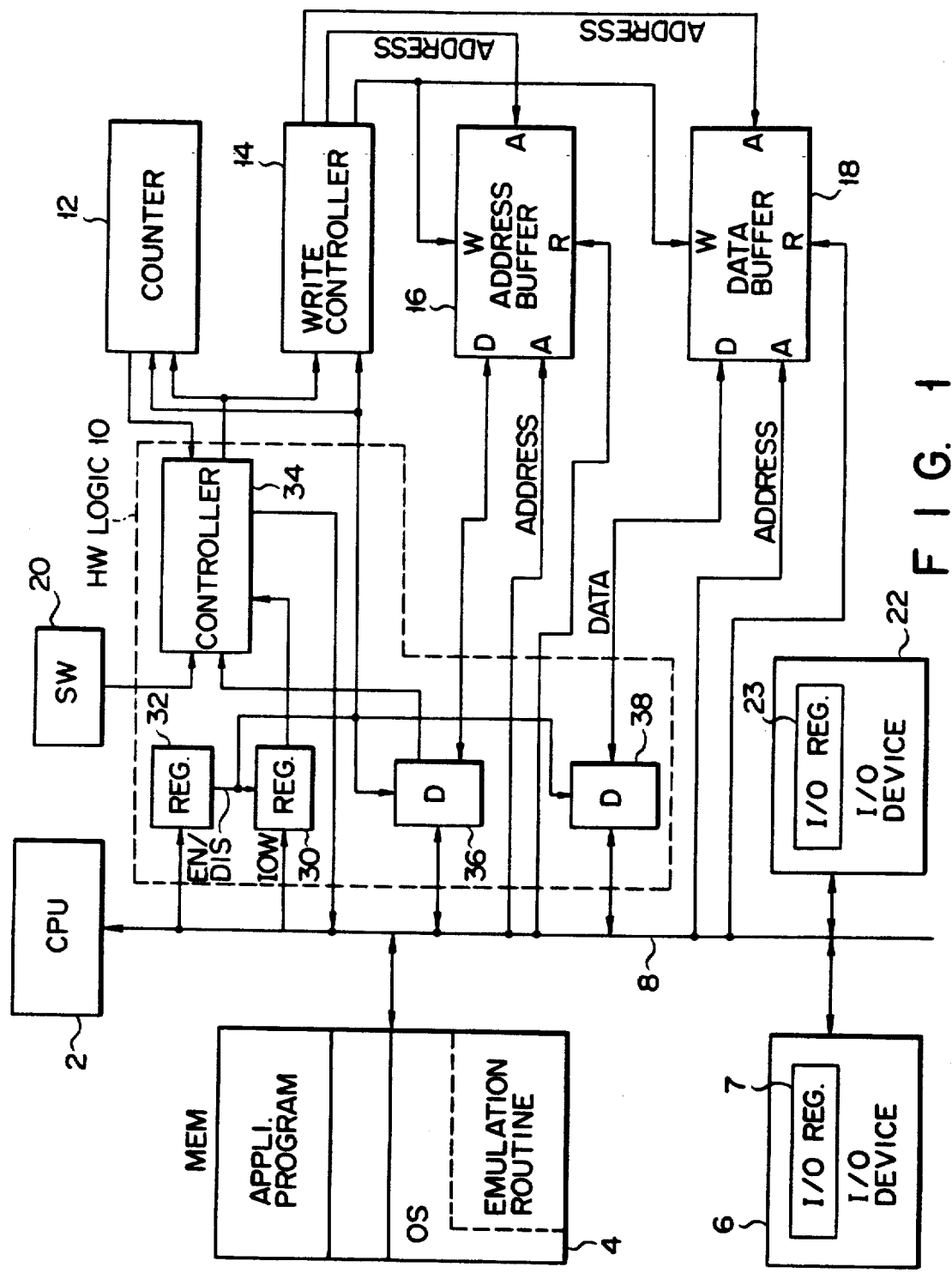
F I G. 1

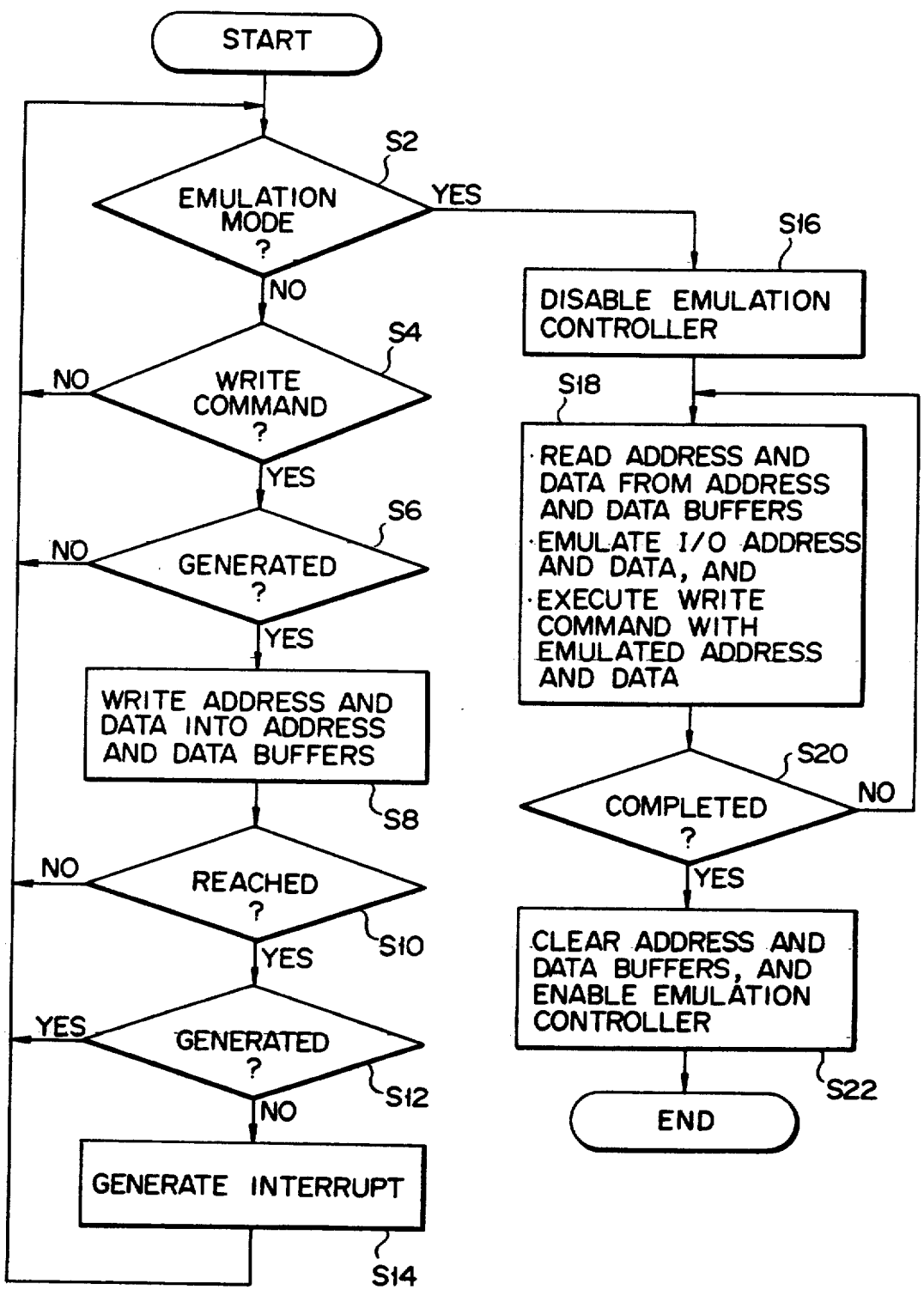
F I G. 2

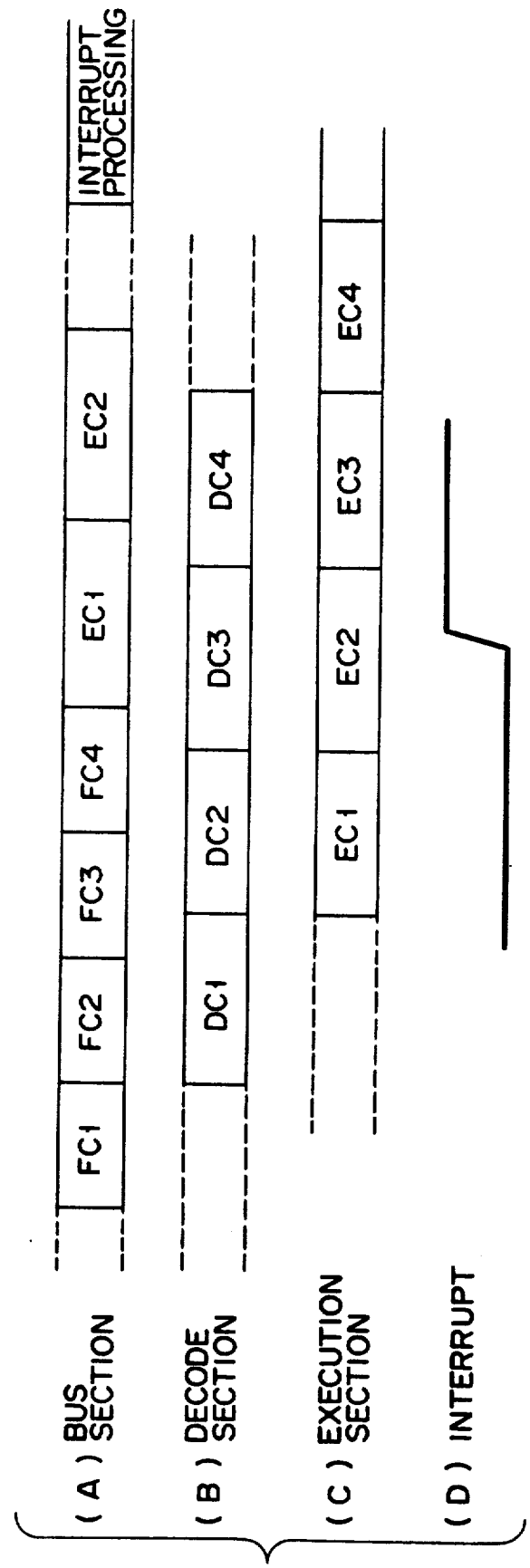
F I G. 3

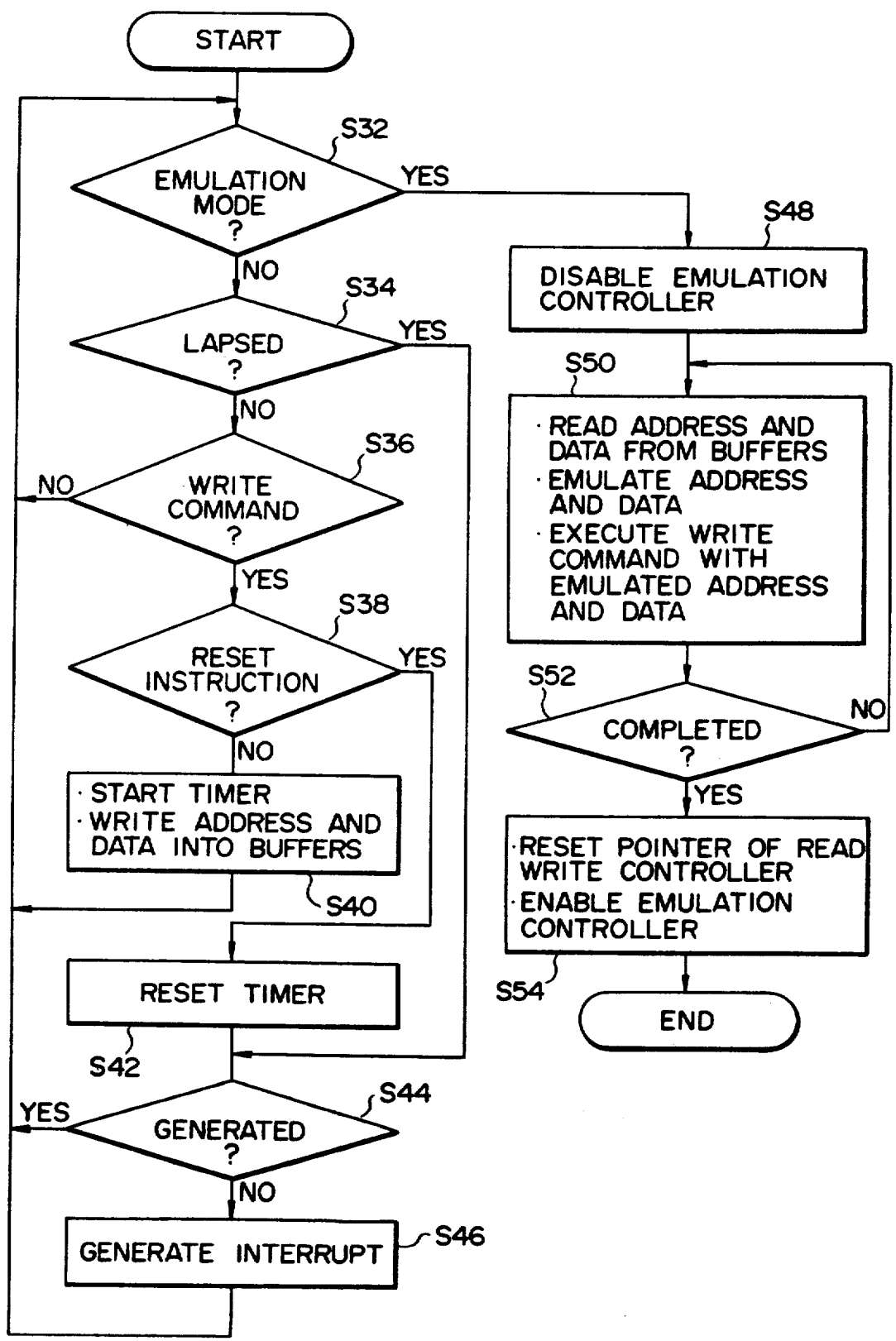
F I G. 5

COMPUTER SYSTEM WITH EMULATION MECHANISM

BACKGROUND OF THE INVENTION

1. Field of the Invention

The present invention relates to a computer system with an emulation mechanism.

2. Description of the Related Art

In recent years, as semiconductor techniques have progressed, microprocessors, peripheral circuit control LSIs and memory LSIs have been manufactured at comparatively low cost. By arbitrarily combining these LSIs, a computer system having relatively high performance can be manufactured. Also in the field of software, a standard operation system (OS) has been developed, and a large number of commercial software packages can be used.

In such a computer system, a device which has been adopted in an application program design is sometimes replaced with another device in order to expand a function. If the original application program is executed for this device, the application program which has normally operated before expansion of the system some times does not operate. In order to solve this problem, emulation processing is generally performed for a version-up device by programs. That is, when a write command is executed for the version-up device, an interrupt to a first CPU is generated by a hardware logic section. In response to the interrupt, a second CPU executes an emulation program to emulate and convert an address, data or the like related to the write command into correct values. Thereafter, the second CPU performs a write operation for the version-up device by using the converted address and data. In this manner, compatibility between the hardware before and after expansion of the function can be maintained.

In the above conventional emulation mechanism, however, if the performance of the CPU or the like is improved to increase a processing speed, a subsequent write command for the version-up device may be undesirably executed after the preceding write command for the device is executed to generate interrupt and before the second CPU activates the emulation program in response to the interrupt. In this case, an address and data related to the first write command are lost.

In addition, if the device is a display unit, this conventional display unit requires an exclusive adapter. For this reason, a computer system capable of supporting various types of display units must comprise corresponding exclusive adapters. Therefore, a system capable of supporting various display units by one adapter has been developed. In such a system, an emulation mechanism supports various display units by one adapter, such that an operation can be normally performed regardless of an adapter accessed by an application program. That is, when a write command is executed by the application program, an interrupt to a CPU is generated, and the write command is emulated for an adapter to be accessed by an emulation program activated by the CPU.

In this method, a satisfactory man-machine interface can be achieved in relatively low-speed processing. However, since interrupt to the CPU is generated each time a write command is executed for the adapter, an instruction execution speed is decreased when write commands are successively executed, thereby adversely affecting the performance of the computer system.

SUMMARY OF THE INVENTION

The present invention has been made in consideration of the above situation and has as its object to provide a computer system with an emulation mechanism which can arbitrarily designate a device requiring emulation, emulate a write command in accordance with the characteristics of the device, store information concerning a plurality of write commands executed from generation of a first write command to activation of an application program by a high-speed CPU without disturbing their order, and execute a conventional application program for a device not compatible with a conventional device.

In order to achieve the above object of the present invention, there is provided a computer system with an emulation mechanism comprising a program execution unit for executing an application program and executing an emulation program in response to an input interrupt, the application program including a write command, and the program execution unit emulating an address and data stored in buffers upon execution of the emulation program, and an emulation control unit for writing the address and data concerning the write command in the buffers in response to the write command, and when a predetermined condition is satisfied, generating and outputting interrupt to the application program execution unit.

In order to achieve the above object of the present invention, there is provided a method of emulating a write command, comprising the steps of executing an application program, the application program including a write command for a predetermined address, storing an address and data concerning the write command in buffers upon execution of the write command, generating emulation interrupt when a predetermined condition is satisfied, and executing an emulation program for the address and data stored in the buffers in response to the emulation interrupt.

As described above, according to the present invention, information concerning a plurality of write commands executed from generation of a first write command to activation of an emulation program can be stored without disturbing their order. Therefore, even if a processing speed of a CPU is increased, all the write commands can be emulated.

In addition, information concerning a device not compatible with a conventional device and requiring emulation processing can be easily set. Therefore, even when version-up of a system is to be performed by connecting various external apparatuses, an application program need not be changed because the emulation program can respond to the version-up.

Furthermore, write commands to be successively executed can be simultaneously emulated, and a decrease in execution speed of the overall system can be suppressed.

BRIEF DESCRIPTION OF THE DRAWINGS

FIG. 1 is a block diagram showing an arrangement of a computer system with an emulation mechanism according to a first embodiment of the present invention;

FIG. 2 is a flow chart for explaining an operation of the first embodiment;

FIGS. 3A to 3D are timing charts for explaining how interrupt processing is executed in a high-speed CPU;

FIG. 5 is a flow chart for explaining an operation of the second embodiment.

DETAILED DESCRIPTION OF THE PREFERRED EMBODIMENTS

Figure 4:
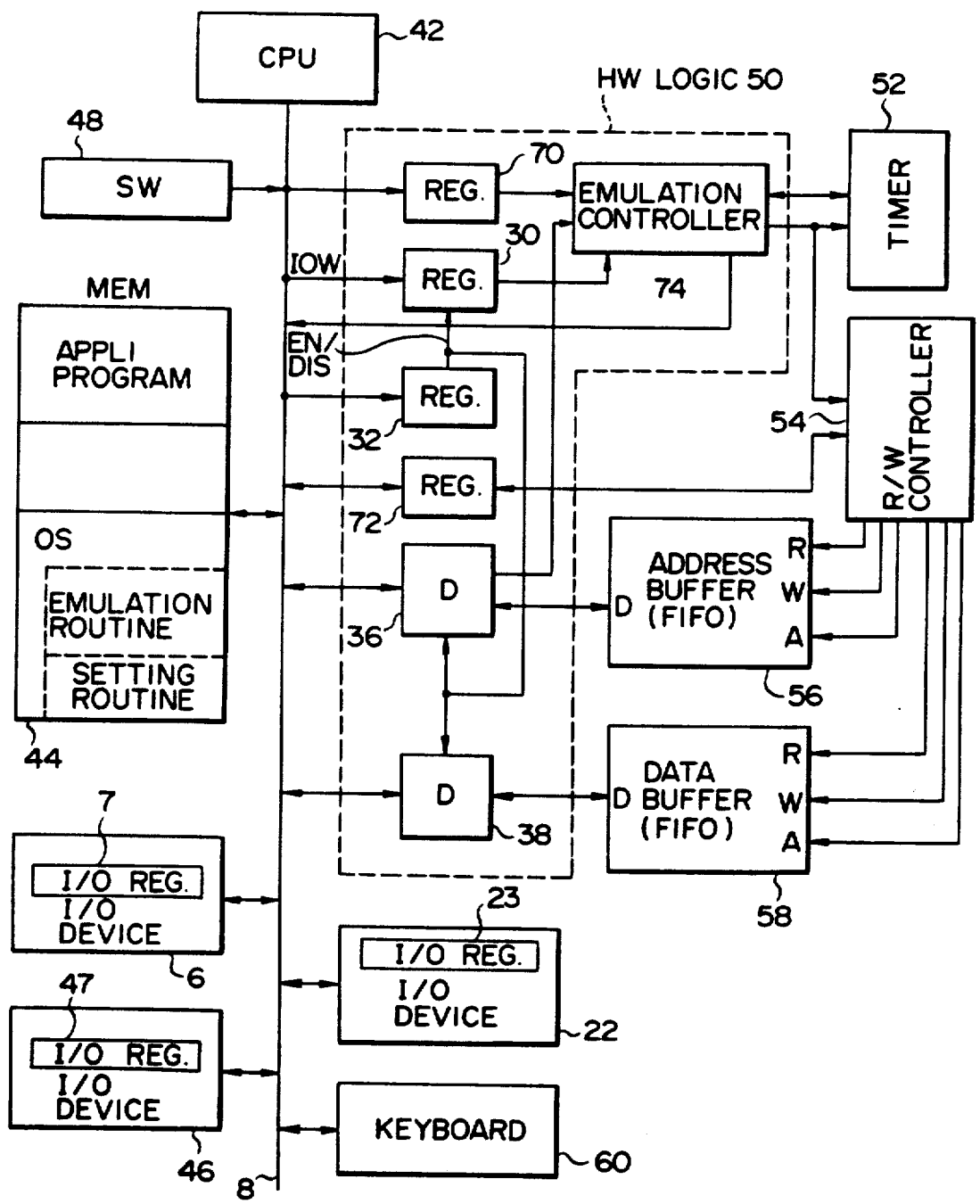
FIG. 4 is a block diagram showing an arrangement of a computer system with an emulation mechanism according to a second embodiment of the present invention.

A computer system with an emulation mechanism according to the present invention will be described in detail below with reference to the accompanying drawings.

Referring to FIG. 1, an arrangement of a computer system according to a first embodiment of the present invention will be described below.

A CPU 2 and a memory 4 are connected to a system bus 8 having an address bus, a data bus and a control bus. The memory 4 stores an application program and an operation system (OS). The OS includes an emulation routine. When the CPU 2 receives emulation interrupt during execution of the application program, it stacks data in an internal register to set an emulation mode, as in the case of normal interrupt, thereby executing the emulation routine. When processing of the emulation routine is ended, the CPU restarts execution of the application program from an interrupted step.

I/O devices 6 and 22 are also connected to the system bus 8. The devices 6 and 22 have I/O registers 7 and 23 assigned with specific addresses, respectively. The device 22 is already connected to the system when the application program is designed. Therefore, the CPU 2 can execute write and read commands in the application program for the device 22 without changing the program. The device 6, however, differs from devices already connected to the system when the application program is designed. Therefore, in order to execute the write and read commands in the application program, the CPU 2 must modify the program.

A hardware logic (HW) 10, an address buffer 16 and a data buffer 18 are connected to the system bus 8. The buffers 16 and 18 are also connected to the HW 10. A write controller 14 is connected to the buffers 16 and 18 and the HW 10, and a counter 12 is connected to the HW 10 and the controller 14. The HW 10 comprises registers 30 and 32, drivers 36 and 38, all connected to the system bus 8, and an emulation controller 34. A switch 20 is connected to the controller 34.

The register 32 receives emulation control start data from the CPU 2 via the data bus and generates an enable signal EN in accordance with the data. The signal EN is output to the register 30, the drivers 36 and 38, the counter 12 and the controller 14. While the signal EN is supplied, the register 30 receives a write control signal IOW corresponding to a write command from the control bus and outputs the signal to the controller 34. In accordance with the signal EN, the driver 36 connected to the address and data buses receives an address from the address bus and outputs the address to the controller 34 and the address buffer 16. Also, in accordance with the signal EN, the driver 38 receives data from the data bus and outputs the data to the data buffer 18. In response to the signal EN, the controller 14 clears the buffers 16 and 18, and the counter 12 is reset to a predetermined count, for example, "10".

In order to execute the emulation routine, the CPU 2 sends emulation control end data to the register 32 via the data bus. In accordance with the end data, the register 32 generates a disable signal DIS. The signal DIS is supplied to the register 30, the drivers 36 and 38 and the controller 14. While the signal DIS is supplied, the register 30 cannot receive the signal IOW from the control bus. In accordance with the signal DIS, the drivers 36 and 38 are inhibited to receive the address and data from the address and data buses, respectively. The drivers 36 and 38, however, output the address and data read out from the buffers 16 and 18 to the data bus, respectively.

A write control signal IOW output to the control bus when the CPU 2 executes a write command of the application program for the register 7 of the device 6 is supplied to the controller 34 via the register 30 as described above. The controller 34 compares an address from the switch 20 with an address from the driver 36. If the addresses coincide with each other, the controller 34 generates and outputs a write control instruction to the counter 12 and the write controller 14. An address assigned to the register 7 is already set in the switch 20 by a user. Write count data representing a predetermined count is set in the counter 12 in response to signal EN. The write count data is decremented by one each time a write control instruction is input from the controller 34. When the write count data reaches "0", an interrupt generation instruction is generated and output to the controller 34. In response to the interrupt generation instruction output from the counter 12, the controller 34 generates and outputs emulation interrupt to the CPU 2 via the control bus.

While the signal EN is input from the register 32, the write controller 14 generates and outputs a write control signal and a buffer address to the buffers 16 and 18, respectively, in response to the write control instruction from the controller 34. The address on the address bus is written in the buffer 16 via the driver 36. The data on the data bus is written in the buffer 18 via the driver 38. After the address and data are stored in the buffers 16 and 18, respectively, the buffer address is updated for the next write operation. The operation of the controller 14 is inhibited in response to the signal DIS from the register 32, and the controller 14 clears the buffers 16 and 18 simultaneously with activation of the signal EN from the register 32.

In order to execute the emulation routine, the CPU 2 outputs the emulation control end data to the register 32 and then outputs a buffer address and a read control signal to the buffers 16 and 18, thereby sequentially reading out an address and data from the buffers 16 and 18, respectively. The readout address and data are converted in accordance with the emulation program and output together with the signal IOW to the register 7 of the I/O device 6. When processing of all the addresses and data stored in the buffers 16 and 18, respectively, is completed, the CPU 2 outputs the emulation control start data to the register 32, thereby ending the emulation routine processing. Thereafter, the CPU recovers the stacked data in the internal register and then restarts the application program from the interrupted step.

An operation of the computer system according to the first embodiment of the present invention will be described below. Assume that the application program stored in the memory 4 is being executed by the CPU 2 and data "10", for example, is set in the counter 12.

In steps S2 and S4, it is waited until a write command in the application program is executed and an emulation mode is set upon generation of emulation interrupt. Since the emulation mode is not currently set, step S4 is executed subsequently to step S2. In step S4, the CPU 2 checks whether a write command is executed for the register 7 of the device 6. That is, since the signal EN from the register 32 is output to the register 30 as described above, the signal IOW output to the control bus of the system bus 8 when the CPU 2 executes the write command for the device 22 is latched by the register 30 and output to the controller 34. In accordance with the signal EN, the address on the address bus is supplied to the controller 34 via the driver 36. The address of the register 7 of the device 6 is supplied from the switch 20 to the controller 34. Therefore, since the two addresses do not coincide with each other, no write control instruction is generated from the controller 34. As a result, N (NO) is determined in step S6. Thereafter, the flow returns to step S2.

When a write command for the register 7 of the device 6 is executed, the signal IOW concerning the write command is latched by the register 30 and supplied to the controller 34 in accordance with the signal EN from the register 32. In response to the signal IOW from the register 30, the controller 34 compares the address supplied from the driver 36 and the address from the switch 20. In this case, since the two addresses coincide with each other, the write control instruction is generated from the controller 34 and supplied to the counter 12 and the controller 14. As a result, Y (YES) is determined in step S6.

The address on the address bus is supplied to the address buffer 16 via the driver 36, and the data on the data bus is supplied to the data buffer 18 via the driver 38. In response to the write control instruction, the write controller 14 outputs the buffer address and the write control signal to the buffers 16 and 18, respectively. In step S8, in response to the write control signal, the address and data are written in the buffers 16 and 18, respectively. Thereafter, the buffer address is updated in order to write the next address and data. The counter 12 is decremented by one in response to the write control instruction.

In step S10, it is determined whether the count of the counter 12 has reached "0". If the count has not reached "0", the flow returns to step S2, and processing from steps S2 to S8 is repeated.

If it is determined in step S10 that the count of the counter 12 has reached "0", it is determined in step S12 whether an emulation interrupt has been generated. If the emulation interrupt has not been generated, the counter 12 generates and outputs the interrupt generation instruction to the controller 34 in step S14. In response to the interrupt generation instruction from the counter 12, the controller 34 generates the emulation interrupt. If it is determined in step S12 that the emulation interrupt is already generated, the flow returns to step S2.

In step S2, it is waited until the emulation interrupt is accepted by the CPU 2. If the next write command is executed before the emulation interrupt is accepted by the CPU 2, the address and data are written in the buffers 16 and 18, respectively, by the processing in step S4 and subsequent steps.

As shown in FIGS. 3A to 3D, the high-speed CPU 2 includes a bus section for fetching a command, a decode section for decoding the fetched command, and an execution section. These sections are pipelined to increase bus operation efficiency. The CPU 2 having such an arrangement fetches, decodes and executes a write command C1 and outputs the write control signal IOW to the system bus. Before the signal IOW is output to the system bus 8 after the command C1 is fetched, however, write commands C2, C3 and C4 are sometimes fetched by the CPU 2. In this case, even if emulation interrupt is generated in response to the signal IOW, this emulation interrupt is not accepted by the CPU 2 until execution of the commands C2, C3 and C4 is completed. A conventional system cannot respond to such a situation. According to the system of the present invention, however, since addresses and data concerning the commands C2, C3 and C4 can be stored in the buffers 16 and 18, respectively, these write commands can be reliably emulated.

When the emulation interrupt is accepted by the CPU 2, the emulation mode is set, and step S16 is executed. In step S16, the CPU 2 outputs the emulation control end data to the register 32. The register 32 generates and outputs the signal DIS to the register 30, the counter 12, and the drivers 36 and 38. The count of the counter 12 is reset to "10". Thereafter, in step S18, the CPU 2 sequentially outputs an address and a read control signal to the buffers 16 and 18 respectively. The address read out from the buffer 16 is supplied to the CPU 2 via the driver 38 and the data bus. The CPU 2 emulates the address and data read out from the buffers 16 and 18 and executes the write command for the register 7 of the device 6 on the basis of the emulated address and data and the signal IOW.

In step S20, the CPU 2 checks whether the processing in step S18 has been performed for all the addresses and data stored in the buffers 16 and 18, respectively. If addresses and data remain in the buffers 16 and 18, respectively, step S18 is repeatedly executed. If Y in step S20, step S22 is executed. In step S22, the emulation control start data is output to the register 32. As a result, the signal EN is generated, and the register 30 and the drivers 36 and 38 are reset. In addition, in response to the signal EN, the controller 14 clears the buffers 16 and 18, and the count of the counter 12 is reset to "10". After the CPU 2 outputs the emulation control start data, it resets the emulation mode and restarts execution of the application program from an interrupted step.

As described above, according to the first embodiment, the address of the device to be subjected to the emulation processing can be designated by the switch. Therefore, the operation can be performed regardless of which device is subjected to version-up. In addition, even if a processing speed of the CPU is high due to pipelining or the like, an address and data concerning a subsequent write command executed before emulation interrupt generated in response to execution of a write command for a device to be emulated is accepted by the CPU can be stored in the buffers. Therefore, the emulation processing can be correctly executed. Furthermore, when the arrangement of the first embodiment is adopted for a system in which a device to be emulated does not require a high-speed response, the emulation processing can be executed without not much decreasing a processing speed of the overall system.

In the first embodiment, the signal EN is supplied to the write controller. The signal EN, however, may be output to the emulation controller. In this case, the emulation controller causes the write controller to clear the address and data buffers.

An arrangement of a computer system according to a second embodiment of the present invention will be described below with reference to FIG. 4. Referring to FIG. 4 the same reference numerals as in FIG. 1 denote the same parts, and a detailed description thereof will be omitted.

Referring to FIG. 4, a CPU 42, a memory 44 and a keyboard 60 are connected to a system bus 8. The memory 44 stores an application program and an operation system (OS). The OS includes an emulation routine and a setting routine. When the system is booted, the CPU 42 executes the setting routine, reads out an address set in a switch 48, and writes the readout address into an emulation controller 74 via a register 70. When the CPU 42 accepts emulation interrupt during execution of the application program, it stacks data in an internal register, sets an emulation mode, and executes the emulation routine, as in a normal interrupt operation. When processing of the emulation routine is ended, the CPU 42 restarts the execution of the application program from an interrupted step.

I/O devices 6, 22 and 46 connected to the system bus 8 include I/O registers 7, 23 and 47 assigned with specific addresses, respectively. The devices 6 and 46 differ from devices already connected to the system when the application program is designed. Therefore, in order to execute write and read commands in the application program, the CPU 42 must modify the program. While the device 6 does not require a high-speed operation, the device 46 must be immediately subjected to emulation processing upon execution of a write command.

A hardware logic (HW) 50 is connected to a timer 52, a read/write controller 54, an address buffer 56 and a data buffer 58. Each of the buffers 56 and 58 is a FIFO memory. The HW 50 includes registers 30, 32, 70 and 72, drivers 36 and 38, all connected to the system bus 8, and an emulation controller 74.

In order to execute the setting routine, the CPU 42 reads out addresses of the registers 7 and 47 of the devices 6 and 46 to be subjected to the emulation processing from the switch 48 and sets the readout addresses in the register 70. Object addresses assigned to the registers 7 and 47 are already set in the switch 48 by a user. An object address set in the register 70 is set in the controller 74. A write control signal IOW output to the control bus when the CPU 42 executes a write command in the application program for the devices 6 and 46 is supplied to the controller 74 via the register 30. In response to the signal IOW, the controller 74 compares the write command address from the driver 36 with the object address. If the write command address coincides with the object address for the device 6, the controller 74 generates a write control instruction. If the write command address coincides with the object address for the device 46, the controller 74 generates a reset instruction. The write control instruction i output to the timer 52 and the controller 54. The reset instruction is output to the timer 52.

In response to the write control instruction from the controller 74, the timer 52 starts a time count and generates an interrupt generation instruction when a predetermined time has elapsed. The timer 52 resets the count when it generates the interrupt generation instruction or in response to the reset instruction from the controller 74. In response to the interrupt generation instruction or when the write command address coincides with the object address for the device 46, the controller 74 generates and outputs an emulation interrupt to the CPU 42.

The controller 54 counts the write control instruction from the controller 74. In addition, in response to the write control signal, the controller 54 generates and outputs a write control signal and pointers to the buffers 56 and 58. In response to the write control signal, the write command address on the address bus is written in an address of the buffer 56 designated by the pointer via the driver 36. The data on the data bus is written in an address of the buffer 58 designated by the pointer via the driver 38. After the address and data are stored in the buffers 56 and 58, the pointer is updated for the next write operation.

In order to execute the emulation routine, the CPU 42 outputs count read control data to the controller 54 via the register 72. In response to the count read control data, the controller 54 outputs the count to the CPU 42. In response to the read control data supplied from the CPU 42 via the register 72, the controller 54 outputs a read control signal and pointers to the buffers 56 and 58. In this manner, an address and data are output from the buffers 56 and 58 to the CPU 42. The readout address and data are converted in accordance with the emulation program and output together with the signal IOW to the registers 7 and 47 of the devices 6 and 46, respectively.

An operation of the computer system according to the second embodiment of the present invention will be described below.

A power source of the computer system is switched on. At this time, the operation system (OS) stored in the memory 44 is activated. While the OS is executed, the setting routine in the OS is executed. In the setting routine, the address of the devices to be subjected to the emulation processing, i.e., the addresses of the registers 7 and 47 of the devices 6 and 46, respectively, already set in the switch 48 are fetched in the CPU 42 and are set in the emulation controller 74 via the register 70 together with timing control data. Thereafter, the application program stored in the memory 44 is executed.

In steps S32 and S36, it is waited until writea command in the application program is executed, the emulation mode is set by emulation interrupt, and a predetermined time elapses. Since the emulation mode is currently not set, step S34 is executed subsequently to step S32. In step S34, it is determined whether a measurement time of the timer 52 has reached a predetermined time. If N in step S34, step S36 is executed. In step S36, it is determined whether the write command for the registers 7 and 47 of the devices 6 and 46 is executed. That is, since the signal EN is output from the register 32 to the register 30 as described above, the signal IOW output to the control bus of the system bus 8 when the CPU 42 executes the write command for the device 22 is latched by the register 30 and output to the controller 74. In accordance with the signal EN, the address on the address bus is supplied to the controller 74 via the driver 36. The object address is already set in the controller 74. Since the two addresses do not coincide with each other in this case, the controller 74 does not generate the write control instruction. As a result, N is determined in step S36. Thereafter, the flow returns to step S32.

When a write command for the register 7 of the device 6 is executed, the signal IOW concerning the write command is latched by the register 30 and supplied to the controller 74 in accordance with the signal EN from the register 32. In response to the signal IOW from the register 30, the controller 74 compares the address supplied via the driver 36 and the object address already set therein. In this case, since the two addresses coincide with each other, the controller 74 generates the write control instruction, and N is therefore determined in step S38. In signal S40, the write control instruction is supplied to the timer 5 and the controller 54. The address on the address bus is supplied to the address buffer 56 via the driver 36, and the data on the data bus is supplied to the data buffer 58 via the driver 38. In response to the write control instruction, the controller 54 outputs pointers and a write control signal to the buffers 56 and 58. In response to the write control signals, the address and data are written in the buffers 56 and 58, respectively. Thereafter, the pointers are updated in order to write the next address and data. The flow then returns to step S32.

When a write command for the register 47 of the device 46 is executed, the controller 74 generates a reset instruction in response to the signal IOW from the register 30. Therefore, Y is determined in step S38, and step S42 is executed. In step S42, the timer 52 is reset. Thereafter, step S44 is executed. When the time measured by the timer 52 reaches a predetermined time, Y is obtained in step S34 and step S44 is executed. In step S44, it is checked whether the emulation interrupt is already generated. If the emulation interrupt is not generated, the emulation interrupt is generated in step S46. If the emulation interrupt is already generated, the flow returns to step S32.

When the emulation interrupt is accepted by the CPU 42, the emulation mode is set, and step S48 is executed. In step S48, the CPU 42 outputs emulation control end data to the register 32. As a result the register 32 generates and outputs the signal DIS to the register 30 and the drivers 36 and 38. In step S50, the CPU 42 outputs count read control data to the register 72 and reads out the count from the controller 54. In accordance with the readout count, the CPU 42 outputs read control data to the controller 54 via the register 72. In accordance with the read control data, the controller 54 generates and outputs a read control signal and pointers to the buffers 56 and 58. As a result, the address and data are read out from the buffers 56 and 58 to the CPU 42 via the drivers 36 and 38, respectively.

The CPU 42 emulates the address and data read out from the buffers 56 and 58, and executes the write command for the device 6 or 46 on the basis of the emulated address and data and the signal IOW.

In step S52, the CPU 42 checks in accordance with the readout count whether the processing in step S50 has been performed for all the addresses and data stored in the buffers 56 and 58, respectively. If addresses and data remain in the buffers 56 and 58, step S50 is repeatedly executed. If Y in step S52, step S54 is executed. In step S54, emulation control start data is output to the register 32. As a result, the signal EN is generated, and the register 30 and the drivers 36 and 38 are reset. In accordance with the reset data input from the CPU 42 via the register 72, the pointer of the controller 54 is reset. After the CPU 42 outputs the emulation control start data and the reset data, it resets the emulation mode and restarts execution of the application program from an interrupted step.

In the above embodiment, the address of the device to be subjected to the emulation processing is input from the switch. The address, however, may be input from the keyboard upon initialization of the system. In addition, in the above embodiment, different pointers are generated from the write controllers in order to store the address and data in the buffers. However, the same pointer may be output to the buffers. Furthermore, in the above embodiment, the address and data are read out from the buffers in accordance with the read control data from the CPU. The controller, however, may generate a pointer for, e.g., each machine cycle in response to single read control data, thereby controlling the read control signal to be supplied to the buffers.

What is claimed is:

1. A method of translating a write command written in a format for a first device so as to be effective for a second device, the method comprising the steps of:
   executing an application program, the application program generating said write command for said first device, said write command having an address and data;
   detecting whether the generation of said write command for said first device is for said second device;
   storing an address and data of the write command for said first device in buffers upon said detection of the write command for said second device;
   generating an interrupt when a predetermined condition is satisfied; and
   executing a translation program for the address and data stored in said buffers in response to the interrupt,
   wherein said interrupt generation step includes generating the interrupt when a predetermined number of write commands for a first device have been generated.

2. A method of translating a write command written in a format for a first device so as to be effective for a second device, the method comprising the steps of:
   executing an application program, the application program generating said write command for said first device, said write command having an address and data;
   detecting whether the generation of said write command for said first device is for said second device;
   storing an address and data of the write command for said first device in buffers upon said detection of the write command for said second device;
   generating an interrupt when a predetermined condition is satisfied; and
   executing a translation program for the address and data stored in said buffers in response to the interrupt, wherein said storage step includes:
   checking whether the address portion of the write command for said first device coincides with a predetermined address corresponding to the second device,
   storing the address and data in said buffers when the address portion of the write command coincides with the predetermined address, and
   storing addresses and data of subsequent write commands generated after the interrupt is generated and before the interrupt is accepted by said translation program executing step.

3. A computer system having a translation function for translating a write command prepared in a first format for a first device so as to be effective for a second device, the system comprising:
   storage means for storing address and data;
   program executing means for executing an application program for generating said write command for said first device, the write command including address and data components, the program executing means comprising means for outputting said write command;

means for executing said translation function in response to an interrupt by generating an address and data having a second format for said second device by translating the address and data corresponding to the write command for said first device; and translation control means for writing the address and data corresponding to the write command having said first format into said storage means when the write command is for said second device, and for generating and outputting said interrupt to said translation function executing means when a predetermined condition is satisfied, said translation function executing means retrieving said address and data from said storage means and generating said address and data having said second format, wherein the predetermined condition is the generation of a predetermined number of write commands for said first device.

4. A computer system having a translation function for translating a write command prepared in a first format for a first device so as to be effective for a second device, the system comprising:

storage means for storing address and data;

program executing means for executing an application program for generating said write command for said first device, the write command including address and data components, the program executing means comprising means for outputting said write command;

means for executing said translation function in response to an interrupt by generating an address and data having a second format for said second device by translating the address and data corresponding to the write command for said first device; and translation control mean for writing the address and data corresponding to the write command having said first format into said storage means when the write command is for said second device, and for generating and outputting said interrupt to said translation function executing means when a predetermined condition is satisfied, said translation function executing means retrieving said address and data from said storage means and generating said address and data having said second format, wherein said translation control means further comprises means for writing into said storage means addresses and data corresponding to subsequent wire commands for said first device generated by said program executing means after the interrupt is generated and before the interrupt is accepted by said translation function executing means.

* * * * *